Feb. 1, 1938.   W. RAISCH   2,107,127
INCINERATION
Filed Oct. 17, 1936
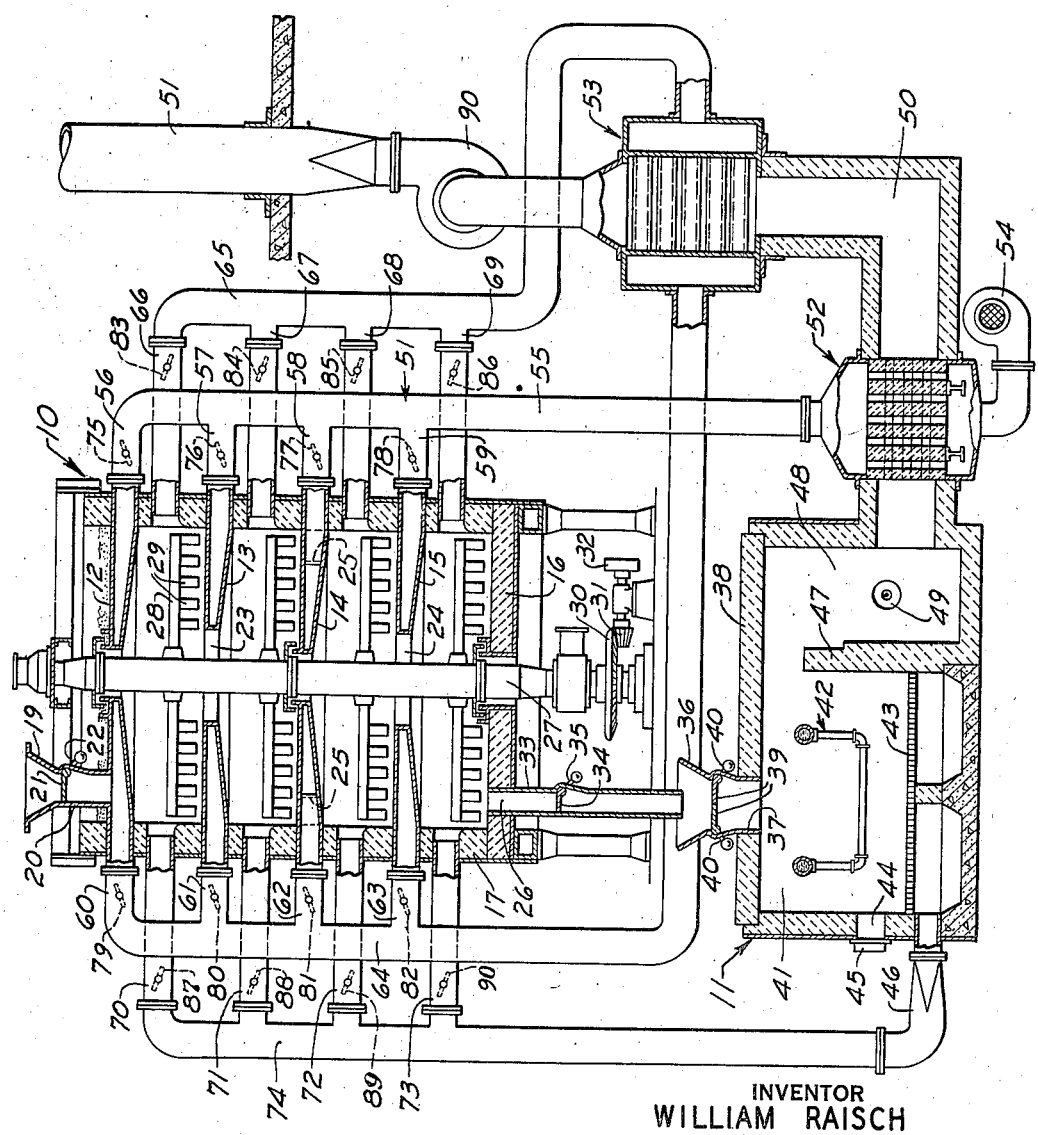
INVENTOR
WILLIAM RAISCH
BY
his ATTORNEY Patented Feb. 1, 1938

2,107,127

UNITED STATES PATENT OFFICE 2,107,127

INCINERATION

William Raisch, New York, N. Y., assignor to Underpinning & Foundation Co., Inc., New York, N. Y., a corporation of New York Application October 17, 1936, Serial No. 106,074

10 Claims. (Cl. 110—8)

My invention relates to incineration and more particularly to the drying and burning of material containing moisture and volatile material, for example sewage sludge, sewage screenings, garbage and municipal waste in general.

The principal objects of the invention are to provide a novel and advantageous apparatus and a novel and advantageous process for drying and burning material, particularly material of the general type specified.

Another object relates to the utilization of air preheated by hot combustion gases resulting from the burning, first to heat apparatus in which the drying of the material is effected and then to heat and dry the material in the drying apparatus by passing the air into direct contact with the material.

In carrying out my invention in a preferred manner, I propose to use for the final burning an incinerator of the Decarie type and for the preliminary drying operation a multiple-hearth dryer or drying furnace which is similar to multiple-hearth roasting furnaces used in the metallurgical industry, except that use is made of hollow hearths of heat conducting material such as steel, cast iron, or other suitable material. Such hollow hearths or drying trays may be in the form of hollow annular chambers through which may be passed air preheated in a heat interchanger through which pass the hot gases of combustion from the incinerator. There may be a separate supply duct for each of the hollow hearths and each of these supply ducts may be provided with a damper. The air introduced into the hollow hearths may be discharged through corresponding ducts individual to the various hollow hearths and also provided with dampers, and the air thus discharged may be conducted through a single manifold or duct and a second preheater also heated by the hot gases after passing through the first preheater.

The air thus reheated may be passed to the various compartments of the multiple hearth dryer through ducts individual to those compartments and provided with dampers. The air introduced into the various compartments together with the vapors of moisture and other materials may be withdrawn through ducts individual to the various compartments and provided with dampers, all of the air and vapors thus withdrawn being passed to the incinerator where the air and combustible gases mixed therewith will assist in the burning and the noxious odors will be eliminated.

In this connection it should be understood that the material dried in the dryer is to be introduced into the incinerator and burned. This dried material together with the combustible gases may serve to maintain the fire in the incinerator, but under some circumstances it may be necessary to introduce auxiliary fuel to the fire grate or to raise the temperature in any other way as by means of oil burners. Due to the provision of dampers in the various inlet and outlet ducts of the dryer, the passage of the air through the various hollow hearths and the interior of the furnace can be controlled largely as desired, that is, different hearths may have the preheated air passed therethrough at different rates and the introduction of air to various compartments as well as the withdrawal of air therefrom may be controlled so as to vary the direction of the flows of air through the dryer.

An important feature of the invention relates to the use as the first preheater of a preheater which will stand high temperatures and will produce a considerable drop in temperature of the gases passing therethrough so that the second preheater may be made of less expensive material. This result may be attained by making the first preheater of refractory material. Such a preheater will not only serve the aforesaid purposes, but will serve to maintain the temperatures of the air preheated thereby substantially uniform.

Other objects, features and advantages will appear upon consideration of the following description and of the drawing in which the figure is a sectional elevation of an approved form of apparatus.

Referring to the drawing, the apparatus may comprise a multiple-hearth dryer or drying furnace 10 and a basket grate furnace 11 of the Decarie type. The dryer may comprise a hollow top 12, three hollow hearths or trays 13, 14, and 15 and a bottom or hearth 16 which is a poor conductor of heat. In order to promote drying of the material under treatment the hollow top 12 and the hollow hearths 13, 14 and 15 are made of heat conducting material such as steel or cast iron. The said top and hearths are spaced apart vertically to provide compartments therebetween and are supported in a peripheral wall 17. The furnace 10 may be provided above the top 12 with any suitable insulating material such as sand.

The material to be dried may be introduced into the top of the dryer or drying furnace 10 through a hopper 19 and a chute 20 extending through the top 12 and provided with a pivoted door 21 normally held in closed position by a weighted arm 22 but arranged to open when a sufficient quantity of material has accumulated thereon. The material thus introduced into the uppermost compartment or zone will fall upon the hearth 13. In order to subject the material to as much contact as possible with air passing through the dryer, and to enable the material to pass downwardly through and out of the dryer or drying furnace 10, the hearths 13 and 15 are provided with central discharge openings or outlets 23 and 24 respectively and hearths 14 and 16 are provided with peripheral outlets 25 and 26.

The material may be worked to the outlets of the various hearths by suitable rabbling means which may comprise a vertical shaft 27 passing freely through the central outlets 23 and 24 of hearths 13 and 15 and through gas seals at the hearths 14 and 16 and the top 12, and rabbling devices extending over said hearths from the vertical shaft and comprising arms 28 and plates 29 so inclined at each hearth as to work the material on the hearths to the corresponding outlets. The shaft 27 may be driven by suitable means such as a bevel gear 30 thereon, a bevel gear 31 meshing therewith, and a pulley 32 secured to said gear 31 and driven from any suitable source of power. When the material on the lowermost hearth or bottom 16 is worked outwardly and around to the outlet 25, it drops into a chute 33 to a pivoted door 34 normally held in closed position by suitable means such as a weighted arm 35. When a sufficient amount of material has accumulated thereon, the door 34 swings open and drying material is discharged from the dryer.

The dried material from the chute 33 at the bottom of the dryer may drop into a hopper 36 at the top of a chute 37 extending through the top 38 of the burning furnace or incinerator 11. The chute 37 may normally be closed by suitable means such as two pivoted gates or doors 39 normally held in closed position by weighted arms 40.

Material entering the incinerator 11 through the chute 37 passes into a burning chamber 41 and falls into a water-cooled basket grate 42 above a fire or burning grate 43. The gases of combustion rising from material burning on the grate 43 pass around and to some extent through the material in the basket grate 42 and dry and partially burn it so that in course of time the material will drop through the basket grate and fall on the grate 43. The material thus falling on the grate 43 may be sufficient to maintain the operation of the furnace, but, if the amount be insufficient, auxiliary fuel may be introduced in any suitable manner, for example, through a port 44 normally closed by a door 45, or by means of an oil burner, not shown. Air may be supplied to the grate 43 in any suitable manner, for example, through a duct or pipe 46. The hot gases from the burning chamber 41 pass upwardly over a bridge wall 47 into an upper part of a combustion chamber 48 in which the combustible gases are finally burned. Chamber 48 may be provided with a burner 49 to assure a sufficiently high temperature.

From the lower part of the combustion chamber 48, the hot gases pass through a flue 50, to a stack 51 through a heat exchanger 52 of refractory material and a second heat exchanger 53 which will be subjected to much lower temperatures and may therefore be made more economically and of suitable material such as sheet steel. The heat exchanger 52 may be in general, like the heat exchanger used in the patent to Buffington No. 1,687,236 dated October 9, 1928 and not only is very much cheaper than a metal heat exchanger of high heat resisting metal, but reduces the temperature of the exhaust gases to such an extent as to enable a relatively cheap type of heat exchanger 53 to be used. Another advantage of having the heat exchanger 52 of refractory material is that it retains heat and tends to maintain the gases, passing therethrough, at a substantially uniform temperature.

The hollow hearths and top of the dryer 10 may be heated by passing therethrough air preheated by passing it through the heat exchanger 52 from a fan 54 to a manifold 55 connected through branches or ducts 56, 57, 58 and 59 with the hollow top 12 and the hollow hearths 13, 14, and 15, respectively. At other points, the hollow top and hearths may be connected correspondingly by ducts 60, 61, 62 and 63 with a manifold 64 which directs the air to the lower temperature part of the heat exchanger 53. In passing through the hollow hearths the preheated air from the heat exchanger 52 is cooled to a substantial extent in warming the interior of the furnace which is in contact with the material, and by passing it through the heat exchanger 53 the temperature is again raised to a sufficient degree and supplied through a manifold 65 and branches or ducts 66, 67, 68 and 69 to the compartments above the hearths 13, 14, 15 and 16 respectively. Air introduced through the branches 66, 67, 68 and 69 may be discharged from the corresponding compartments through branches or ducts 70, 71, 72 and 73 to a manifold 74 connected with the duct 46 to supply preheated air beneath the grate 40 of the incinerator.

In order to control the flow of preheated air into the various hollow trays 12, 13, 14 and 15, the inlet ducts 56, 57, 58 and 59 may be provided with dampers 75, 76, 77 and 78 respectively, and the outlet ducts 60, 61, 62 and 63 may be provided with dampers 79, 80, 81 and 82. In order to control the flow through the compartments of the furnace of air discharged from the hollow hearths or trays and reheated by passage through the heat exchanger 53, the inlet ducts 66, 67, 68 and 69 may be provided with dampers 83, 84, 85 and 86, and the outlet branches 70, 71, 72 and 73 may be provided with dampers 87, 88, 89 and 90.

In order to assure suitable flow of gaseous material from the incinerator 11 to the stack 51, a fan 90 may be placed between the heat exchanger 53 and the stack 51.

During the normal operation of the apparatus, the material which may be sewage sludge, is supplied to the hopper 19 and fed by gravity past the pivoted door 21 and through the chute 20 into the upper compartment of the dryer 10 where it falls on the hearth 13. By the action of the rabbling means the material is in general kept in a single layer on each hearth and is fed by the blades 29 inwardly to the central outlets 23 and 24 of hearths 13 and 15, and outwardly to the peripheral outlets 25 and 26 in the hearths 14 and 16, thus being fed gradually downwardly to the bottom of the dryer and to the outlet 26.

From the outlet of the dryer 10 the dried material is fed intermittently into the burning or furnace chamber 41 of the incinerator 11 where it is received in the basket grate 42. Here it is subjected to the action of hot gases of combustion resulting from the burning of material on the fire grate 43 and after further drying and more or less charring and burning falls to the grate 43 and serves as fuel for drying and burning the other material deposited in basket grate 42. The hot gases of combustion pass over the bridge wall 47 into the gas combustion chamber 48 where if necessary additional heat is supplied by suitable means such as an oil burner.

From the combustion chamber 48 the hot gases pass through the duct 50 and the heat exchangers 52 and 53 therein to the stack 51. The heat exchanger 52, through which air is passed by means of the fan 54 to the hollow hearths, is preferably made of refractory material so that when once heated its temperature will not vary rapidly thereby tending to keep at a uniform temperature the air passing therethrough to the hollow hearths and also tending to keep the temperature of the hot gases discharged therefrom to the stack at a more uniform temperature.

The preheated air from the heat exchangers 52 is introduced into the various hollow hearths and tends to heat the material in the dryer and also the air and gases in the various compartments. The air and vapors withdrawn from the hollow hearths are of course at a much lower temperature than the preheated air introduced to the hearths and are passed through the heat exchanger 53 so that when introduced into the various compartments of the dryer the air and vapors will be at a much higher temperature. In the compartments of the dryer the air comes into direct contact with the material and tends to dry the latter as well as to volatilize any volatile matter therein. The air thus laden with vapors and moisture and other material is then passed to the incinerator where it aids in combustion and is subjected to sufficiently high temperatures to eliminate noxious odors. The material burned in the incinerator falls through the fire grate 43 and may be removed in any suitable manner and the final gases of combustion pass through the flue 50 and the heat exchangers 52 and 53 therein to the stack 51 and are discharged into the atmosphere.

If desired the flow of air through the various hearths might be varied by inserting dampers at the proper places in the manifolds 51 and 64.

It will be evident that effective and economical drying and burning may be effected by use of the apparatus of the present invention.

It should be understood that various changes may be made and various features used without others, without departing from the true scope and spirit of the invention.

Having thus described my invention, I claim:

1. In combination, a multiple-hearth dryer divided into compartments by vertically spaced trays including a group of hollow trays, and means for passing preheated air through said hollow trays and then through said compartments wherein the air becomes laden with moisture and vapors of volatile material, said dryer including means for feeding said material downwardly from tray to tray until discharged from the dryer, and an incinerator receiving the dried material and the air laden with moisture and vapors to burn the combustible material and gases and eliminate noxious odors.

2. In combination, a multiple-hearth dryer divided into compartments by vertically spaced trays including a group of hollow trays, and means for passing preheated air through said hollow trays and then through said compartments wherein the air becomes laden with moisture and vapors of volatile material, said dryer including means for feeding said material downwardly from tray to tray until discharged from the dryer, an incinerator receiving the dried material and the air laden with moisture and vapors to burn the combustible material and eliminate noxious odors, and a heat exchanger in which the hot gases from the incinerator heat the air supplied to the hollow trays.

3. In combination, a multiple-hearth dryer divided into compartments by vertically spaced trays including a group of hollow trays, and means for passing preheated air through said hollow trays and then through said compartments wherein the air becomes laden with moisture and vapors of volatile material, said dryer including means for feeding said material downwardly from tray to tray until discharged from the dryer, an incinerator receiving the dried material and the air laden with moisture and vapors to burn the combustible material and eliminate noxious odors, and a heat exchanger in which the hot gases heat the air passing from the hollow trays to the compartments.

4. In combination, a multiple-hearth dryer divided into compartments by vertically spaced trays including a group of hollow trays, and means for passing preheated air through said hollow trays and then through said compartments wherein the air becomes laden with moisture and vapors of volatile material, said dryer including means for feeding said material downwardly from tray to tray until discharged from the dryer, an incinerator receiving the dried material and the air laden with moisture and vapors to burn the combustible material and eliminate noxious odors, a heat exchanger in which the hot gases of combustion heat the air passing to the hollow trays, and a heat exchanger in which the hot gases heat the air passing from the hollow trays to the compartments.

5. In combination, a multiple-hearth dryer divided into compartments by vertically spaced trays including a group of hollow trays, and means for passing preheated air through said hollow trays and then through said compartments wherein the air becomes laden with moisture and vapors of volatile material, said dryer including means for feeding said material downwardly from tray to tray until discharged from the dryer, an incinerator receiving the dried material and the air laden with moisture and vapors to burn the combustible material and eliminate noxious odors, a heat exchanger receiving the hot gases of combustion and heating the air passing to the hollow trays, and a second heat exchanger receiving hot gases from the first heat exchanger and heating the air passing from the hollow trays to the compartments.

6. In combination, a multiple-hearth dryer divided into compartments by vertically spaced trays including a group of hollow trays, and means for passing preheated air through said hollow trays and then through said compartments wherein the air becomes laden with moisture and vapors of volatile material, said dryer including means for feeding said material downwardly from tray to tray until discharged from the dryer, an incinerator receiving the dried material and the air laden with moisture and vapors to burn the combustible material and eliminate noxious odors, a heat exchanger receiving hot gases of combustion and heating the air passing to the hollow trays, and a second heat exchanger receiving hot gases from the first heat exchanger and heating the air passing from the hollow trays to the compartments, the first preheater being of refractory material and producing a substantial drop of temperature in the hot gases passing therethrough and enabling the second heat exchanger to be used at moderate temperatures.

7. The method of drying and burning material containing moisture and volatile matter, which comprises passing the material to be treated downwardly from zone to zone of a group of drying zones, while retaining the material for short intervals in flat layers in the different zones, passing preheated air between said zones and out of contact with material and air and vapors in the zones, subsequently passing the air through the zones in contact with the material therein whereby the material will be dried and vapors of moisture and volatile matter taken up by the air, and burning the dried material and the air laden with said vapors.

8. The method of drying and burning material containing moisture and volatile matter, which comprises passing the material to be treated downwardly from zone to zone of a group of drying zones, while retaining the material for short intervals in flat layers in the different zones, passing preheated air between said zones and out of contact with material and gases and vapors in the zones, subsequently passing the air through the zones in contact with the material therein whereby the material will be dried and vapors of moisture and volatile matter taken up by the air, burning the dried material and the air laden with said vapors to form ash and hot exhaust gases of combustion, and bringing the hot exhaust gases into heat interchanging relation with air to preheat it before it passes into said zones.

9. The method of drying and burning material containing moisture and volatile matter, which comprises passing the material to be treated from zone to zone of a group of drying zones, while retaining the material for short intervals in flat layers in the different zones, passing preheated air between said zones and out of contact with material and gases and vapors in the zones, subsequently passing the air through the zones in contact with the material therein whereby the material will be dried and vapors of moisture and volatile matter taken up by the air, and burning the dried material and the air laden with said vapors to form ash and hot gases of combustion, and bringing the hot gases of combustion into heat exchanging relation with the air passing from between the zones into the zones to raise the temperature of the air.

10. The method of drying and burning material containing moisture and volatile matter, which comprises passing the material to be treated from zone to zone of a group of drying zones, while retaining the material for short intervals in flat layers in the different zones, passing preheated air between said zones and out of contact with material and gases and vapors in the zones, subsequently passing the air through the zones in contact with the material therein whereby the material will be dried and vapors of moisture and volatile matter taken up by the air, and burning the dried material and the air laden with said vapors to form ash and hot gases of combustion and passing the hot gases thus formed into heat exchanging relation with the air to be passed between the zones thereby preheating the air, and then passing the same hot gases into heat exchanging relation with the air passing from between the zones into the zones.

WILLIAM RAISCH.